United States Patent
Zhang et al.

(10) Patent No.: US 10,854,890 B2
(45) Date of Patent: Dec. 1, 2020

(54) CROSS-LINKED POROUS MEMBRANE FROM HYDROLYSIS OF ESTER-CONTAINING SIDE CHAIN AND PREPARATION METHOD THEREOF

(71) Applicant: DALIAN UNIVERSITY OF TECHNOLOGY, Dalian (CN)

(72) Inventors: Fengxiang Zhang, Dalian (CN); Yanjiao Ma, Dalian (CN); Shupeng Zhao, Dalian (CN); Ruijun Gan, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 96 days.

(21) Appl. No.: 16/328,204

(22) PCT Filed: May 21, 2018

(86) PCT No.: PCT/CN2018/087658
§ 371 (c)(1),
(2) Date: Feb. 25, 2019

(87) PCT Pub. No.: WO2018/214843
PCT Pub. Date: Nov. 29, 2018

(65) Prior Publication Data
US 2019/0181459 A1 Jun. 13, 2019

(30) Foreign Application Priority Data
May 22, 2017 (CN) .......................... 2017 1 0360200

(51) Int. Cl.
| | |
|---|---|
| *H01M 8/02* | (2016.01) |
| *H01M 8/18* | (2006.01) |
| *C08F 220/18* | (2006.01) |
| *C08F 220/14* | (2006.01) |
| *C08J 3/24* | (2006.01) |
| *C08J 5/22* | (2006.01) |
| *H01M 8/0239* | (2016.01) |

(52) U.S. Cl.
CPC ......... *H01M 8/0239* (2013.01); *C08F 220/14* (2013.01); *C08F 220/18* (2013.01); *C08J 3/24* (2013.01); *C08J 5/2231* (2013.01); *C08J 5/2243* (2013.01); *C08J 5/2287* (2013.01); *H01M 8/188* (2013.01); *C08F 220/1804* (2020.02); *C08F 2810/20* (2013.01); *C08J 2333/10* (2013.01); *C08J 2333/12* (2013.01)

(58) Field of Classification Search
CPC ... H01M 8/0239; H01M 8/188; C08F 220/18; C08F 220/14; C08F 220/1804; C08F 2810/20; C08J 3/24; C08J 5/2287; C08J 5/2243; C08J 5/2231
USPC .......................................................... 521/27
See application file for complete search history.

(56) References Cited

U.S. PATENT DOCUMENTS 7,947,196 B2 * 5/2011 Lee .......................... B01J 47/12
                                                                252/184
9,611,368 B2 * 4/2017 Lin ........................ B01D 71/82

FOREIGN PATENT DOCUMENTS

| | | |
|---|---|---|
| CN | 102024928 A | 4/2011 |
| CN | 102181069 A | 9/2011 |
| CN | 103237591 A | 8/2013 |
| CN | 107204475 A | 9/2017 |
| JP | 2005-038669 A | 2/2005 |
| JP | 2009-123437 A | 6/2009 |

* cited by examiner

*Primary Examiner* — Michael Bernshteyn
(74) *Attorney, Agent, or Firm* — Muncy, Geissler, Olds & Lowe, PC

(57) ABSTRACT

The present invention relates to a cross-linked porous membrane from hydrolysis of ester-containing side chain and a preparation method thereof. Firstly, membrane material is obtained through copolymerization of four monomers including butyl methacrylate, styrene, sodium sulfonated styrene and vinylbenzyl chloride. In membrane formation, a small amount of lithium chloride micromolecule porogen is added and cross-linked by using tetramethyl hexamethylene diamine to prepare a nanoscale dense membrane through hydrolysis under the alkaline condition. Through the characteristic of hydrolysis of a butyl ester side chain in the polymer under the alkaline condition, the space originally occupied by the butyl ester in the hydrolyzed membrane is vacated; and after hydrolysis, with the appearance of carboxylic acid ionic conduction groups, a large quantity of ester bonds is hydrolyzed, so that the patency of ion transfer channels in the membrane is enhanced. Thus, ionic conductivity of the membrane is greatly enhanced. The nanoscale porous membrane prepared by the present invention not only has good selectivity and battery performance, but also reduces the preparation cost of the membrane to a great extent, and is suitable for application in all vanadium flow batteries.

3 Claims, 4 Drawing Sheets

CROSS-LINKED POROUS MEMBRANE FROM HYDROLYSIS OF ESTER-CONTAINING SIDE CHAIN AND PREPARATION METHOD THEREOF

TECHNICAL FIELD

The present invention belongs to the field of all vanadium flow batteries, and in particular relates to a cross-linked porous membrane from hydrolysis of side chain butyl methacrylate and a preparation method thereof.

BACKGROUND

With the development of the society and the progress of human civilization, the consumption of energy in the 21st century is getting higher and higher and reaches a new level. The consumption of conventional energy mainly including fossil fuel such as coal, oil and natural gas is increasing, so people around the world look for substitution methods to obtain the energy. Batteries are relatively independent, can convert chemical energy into electrical energy, and mainly include fuel cells and a variety of storage batteries. However, it is difficult to achieve large-scale energy storage due to the disadvantages of high price of the fuel cells and low net efficiency of energy conversion. Considering the need of large-scale storage of electric energy, in different types of storage batteries, the all vanadium flow battery (hereafter referred to as VRB) is considered as the most promising large-scale energy storage technology at present.

The all vanadium flow battery is an electrochemical energy storage device, and realizes conversion of electric energy and chemical energy through valence change of active substance-vanadium ion in an electrolyte, so as to realize storage and release of the electric energy. The VRB has many characteristics and advantages of large scale, high battery efficiency, long service life, low cost, etc.

In the VRB, a membrane not only separates positive and negative electrolytes to prevent the battery from being short-circuited, but also allows charge carrier ions to pass through, so as to guarantee the charge balance between positive and negative poles and constitute a battery loop. An ideal ion exchange membrane for the VRB shall have the following characteristics.

(1) Low vanadium ion crossover. The membrane of the VRB shall reduce ion cross contamination and self discharge of the battery as much as possible, and improve energy efficiency.

(2) High ionic conductance and low membrane resistance to improve voltage efficiency.

(3) High stability. The ideal ion exchange membrane has good mechanical strength, and oxidation resistance and chemical corrosion resistance properties.

(4) Low water flux so as to keep balance between positive and negative electrolytes in charging and discharging.

(5) Low price to achieve the requirement for scale application.

At present, in the ion exchange membrane, a proton exchange membrane which is widely used in the all vanadium flow battery is mainly a perfluorosulfonic acid membrane produced by Dupont, i.e., Nafion® membrane. However, wide application of the Nafion® membrane is limited by its disadvantages of high vanadium crossover, high price, etc. A membrane material with low price and excellent performance is needed to replace the Nafion® membrane. More attention is paid to non-fluorinated material, such as imidazolium functionalized anion exchange membranes with polysulfone as main chain, sulfonate membranes with polyimide as main chain, and amphoteric non-fluorinated membranes. The appearance of these non-fluorinated membranes greatly reduces the cost of the membranes. However, these membranes have poor stability due to the degradation of ionic groups and main chains. The pore size exclusion effect of the porous membrane can be used to exclude hydrogen ions and vanadium ions effectively. The existence of pore channels in the porous membrane can reduce the amount of ionic conduction groups, and thus the stability of the membrane can be effectively improved. The pore size of the existing porous membrane is not uniform, and the morphology of the pore is not easy to control, thereby further limiting the improvement of the performance of the membrane.

In this patent, a cross-linked porous membrane is prepared through a method of hydrolyzing side chain butyl methacrylate. The selectivity of the membrane can be improved through the pore size exclusion effect.

SUMMARY

In view of the problems in the prior art, the present invention adopts a side chain hydrolysis method to prepare a nanoscale porous membranes, to provide a cross-linked porous membrane from hydrolysis of ester-containing side chain and a preparation method thereof. The porous membrane prepared by the method has high selectivity and good battery performance.

The technical solution of the present invention is as follows:

A cross-linked porous membrane from hydrolysis of an ester-containing side chain is provided. The cross-linked porous membrane is prepared through hydrolysis of a copolymer of ester-containing side chain in the presence of a micromolecule porogen under the alkaline condition. The copolymer of the ester-containing side chain is prepared by copolymerization of vinylbenzene, an ester-containing monomer, a vinylbenzyl chloride (VBC) monomer and an azodiisobutyronitrile initiator; the ester-containing monomer comprises butyl methacrylate, ethyl methacrylate and propyl methacrylate. The micromolecule porogen is lithium chloride. Alkalis in the alkaline hydrolysis condition are sodium hydroxide and potassium hydroxide of 3-6 mol/L.

The chemical structural formula of the cross-linked porous membrane is shown below:

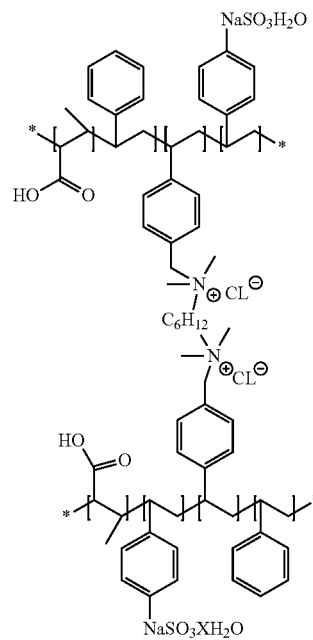

A preparation method for the above cross-linked porous membrane is provided, comprising: firstly, synthesizing a copolymer of four monomers including vinylbenzene, sodium sulfonated styrene, butyl methacrylate and vinylbenzyl chloride; adding a small amount of lithium chloride micromolecule porogen in membrane forming and cross-linking by using tetramethyl hexamethylene diamine to obtain a dense membrane; and finally hydrolyzing the dense membrane. The preparation process of the present invention comprises the following steps:

(1) Synthesizing the Copolymer dissolving a certain amount of sodium sulfonated styrene (Nass) in N,N-dimethylformamide (DMF) solvent at room temperature; respectively adding styrene (st), the ester-containing monomer, the VBC monomer and the azodiisobutyronitrile initiator (AIBN) under nitrogen protection; precipitating the obtained solution in a mixture of ethanol and water after reaction for 16-24 h at 50-80° C.; and washing the obtained precipitate with a detergent and drying at vacuum for 24-48 h at 40-80° C. to obtain a yellowish granular product which is the copolymer, wherein the detergent is the mixture of ethanol and water. A molar ratio of the st to the ester-containing monomer to the VBC to the Nass to the AIBN is 0-35:50-85:12.5:2.5:0.1. The concentration of the Nass solvent is 0.125 mmol/ml. The ester-containing monomer comprises butyl methacrylate (BMA), methyl methacrylate (MMA) and ethyl methacrylate (HMA).

(2) Cross-Linked Membrane Forming

Dissolving the polymer prepared in the step (1) in a solvent at room temperature; adding a cross-linking agent and the micromolecule porogen after dissolving; molar weights of the cross-linking agent and the micromolecule porogen being 12.5% and 7.5% of the molar weight of the polymer; generating a cross-linking reaction for 30-60 minutes at room temperature to obtain a mixture; dropwise adding the mixture to a glass plate; and drying for 24-48 h at 40-80° C. to obtain a dense membrane.

The mass ratio of the polymer to the solvent is 3%-10%. The cross-linking agent is tetramethyl hexamethylene diamine, and the micromolecule porogen is lithium chloride. The solvent is N,N-dimethylformamide (DMF), N,N-dimethylacetamide (DMAc), dimethyl sulfoxide (DMSO) or N-methylpyrrolidone (NMP), and the ratio of a solvent polymer is 0.2 ml/mmol.

(3) Preparing the Porous Membrane Through Alkaline Thermal Hydrolysis

Stripping the above dense membrane from the surface of the glass plate at room temperature, and placing the dense membrane in deionized water for 24-48 h; taking out the dense membrane, placing the dense membrane in aqueous alkali of 4-6M, and hydrolyzing for 7-12 days at 60-90° C.; changing the sodium hydroxide solution every two days in order to promote the hydrolysis of ester bond; hydrolyzing a butyl ester side chain under the alkaline condition to produce carboxylic acid, so that the space originally occupied by the butyl ester is vacated to form a nanochannel.

Flushing the above hydrolyzed dense membrane with flowing deionized water for 5 minutes and then immersing the hydrolyzed dense membrane in the deionized water for 24-48 h until the surface of the membrane is neutral; immersing the membrane with a neutral surface in sulfuric acid solution of 1M, and placing the membrane into the deionized water after 24 h for standby.

The chemical structural formula is as follows:

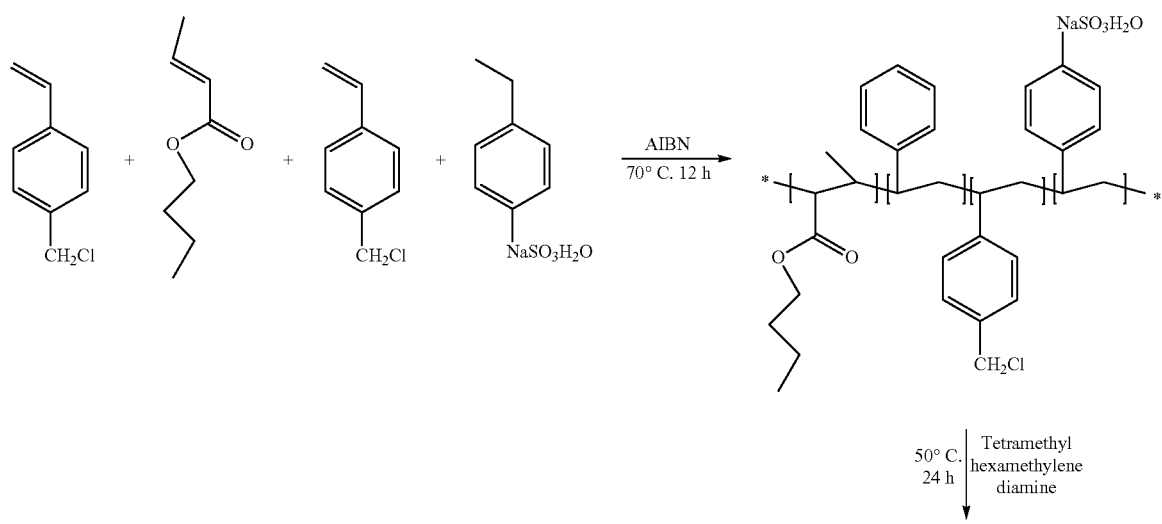

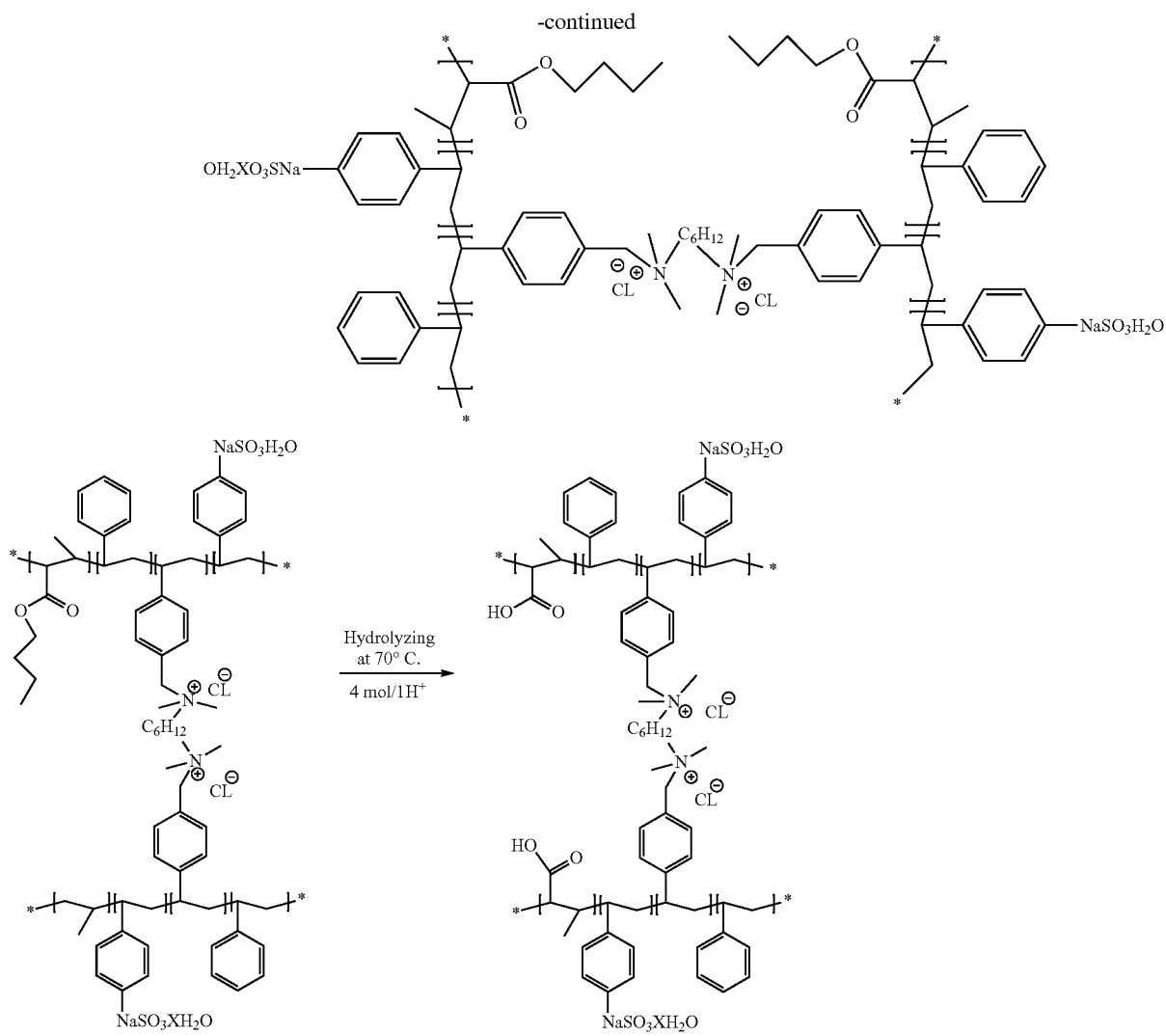

The present invention has the beneficial effects: the preparation method of the present invention is simple and easy. The prepared porous membrane has high selectivity and good battery performance. On the premise of keeping good membrane performance, preparation stock is cheap and membrane cost is low.

DETAILED DESCRIPTION

Figure 1:
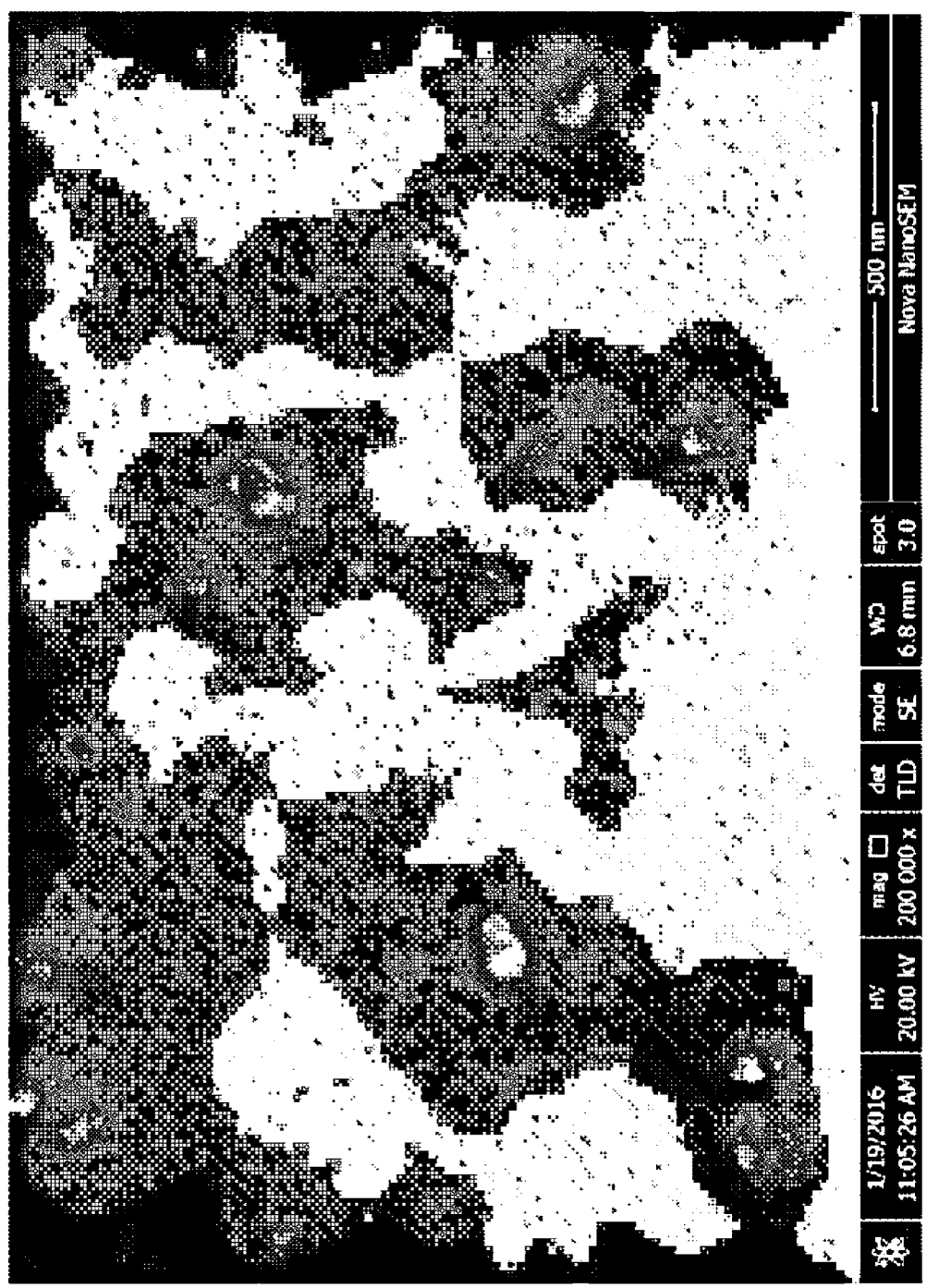
FIG. 1 is an SEM graph of a cross-linked porous membrane.
Figure 2:
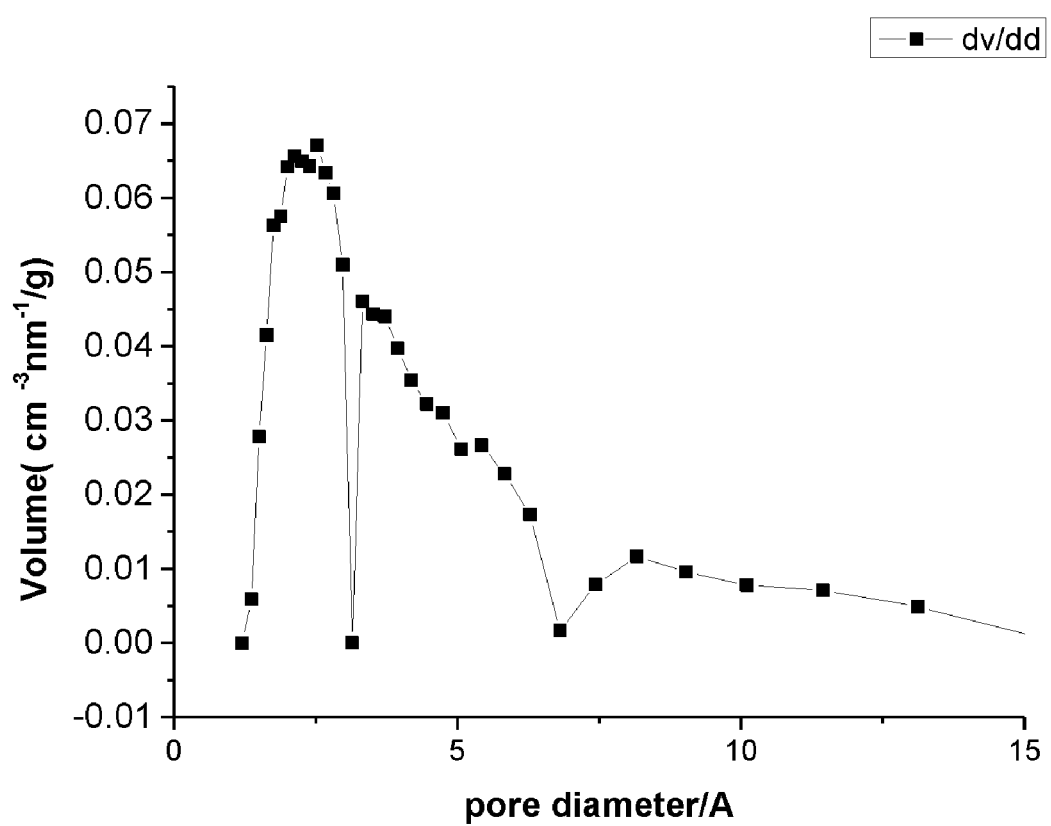
FIG. 2 is a pore size distribution diagram of a cross-linked porous membrane BET.
Figure 3:
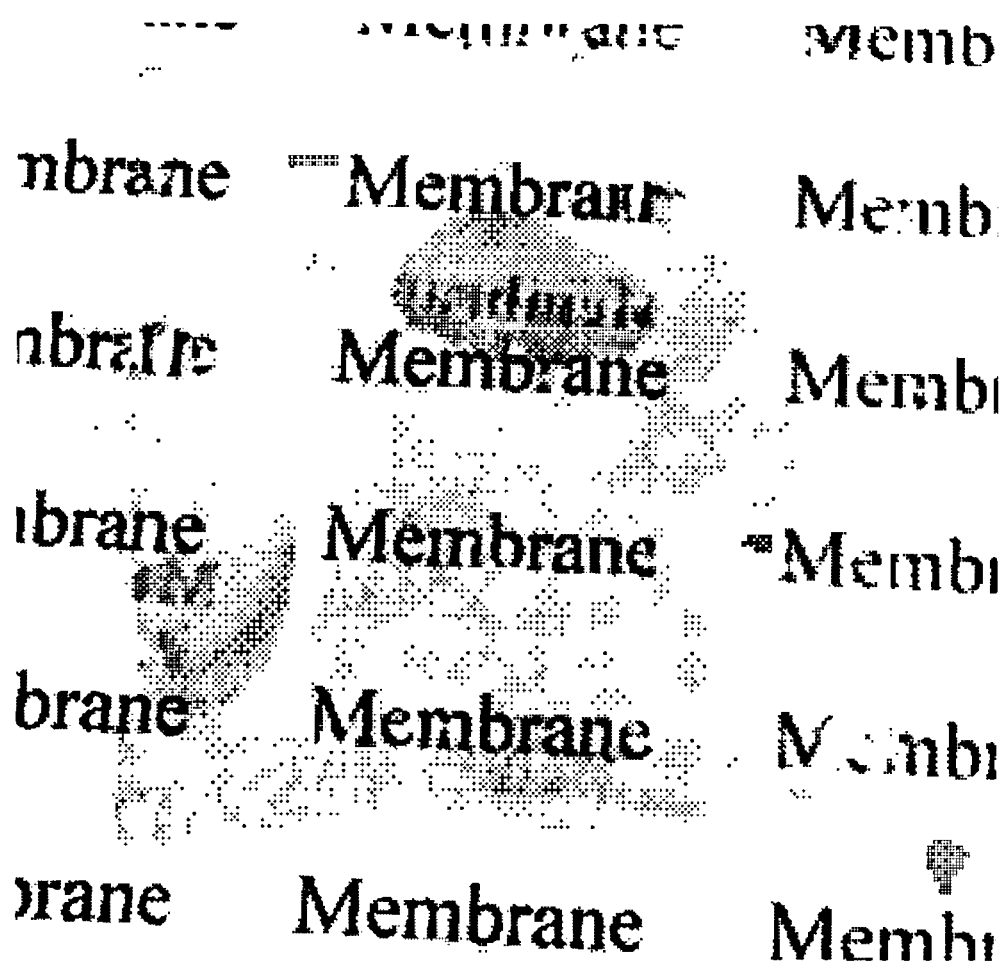
FIG. 3 is an apparent diagram of a hydrolyzed cross-linked porous membrane.
Figure 4:
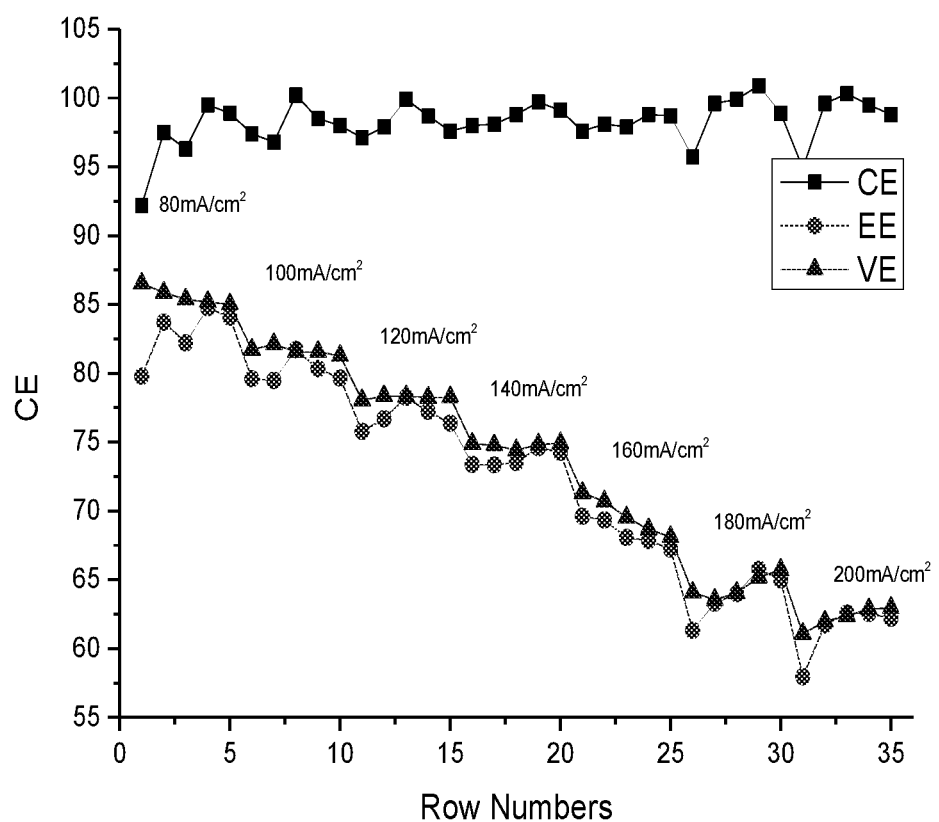
FIG. 4 is a battery performance diagram of a cross-linked porous membrane under gradient current density.

The present invention is further described below in combination with specific embodiments.

Embodiment 1

0.5725 g of Nass is added to 20 ml of DMF solvent at room temperature and is dissolved. 1.72 ml of st, 11.23 ml of BMA and 1.96 ml of VBC monomer are respectively added in nitrogen atmosphere. After the temperature is increased to 65° C., 0.0167 g of AIBN is added. The reaction is conducted for 20 h at a constant temperature of 65° C. The obtained solution is precipitated in a mixture of ethanol and water, and washed repeatedly for three times (3 h each time) with the mixed solution of ethanol and water. The ratio of the ethanol to the water is 7:1. The obtained solution is subjected to suction filtration with a funnel. Finally, the obtained solution is dried in a vacuum drying oven of 50° C. for 24 h to obtain a yellowish granular polymer.

0.195 g of copolymer and 0.015 g of lithium chloride are dissolved in 5 ml of N,N-dimethylacetamide. After complete dissolving, 21 microlitres of tetramethyl hexamethylene diamine are added, and cross-linked for 30 minutes at room temperature. The above casting solution is cast on a glass plate into a membrane. The membrane is dried for 24 h at 50° C. to obtain a cross-linked dense membrane.

The above obtained membrane is stripped from the surface of the glass plate, and is placed in deionized water for 24 h. Then, the membrane is placed in aqueous alkali of 4.0 M, and hydrolyzed for 7 days at 70° C. The sodium hydroxide solution is changed every two days in order to promote the hydrolysis of ester bond.

The above hydrolyzed membrane is flushed with flowing deionized water for 5 minutes and then placed in the deionized water for 24-48 h until the surface of the membrane is neutral. The membrane with a neutral surface is immersed in sulfuric acid solution of 1M, and placed into the deionized water after 24 h for standby.

The obtained membrane has a water absorption rate of 30% and a swelling rate of 11%.

Embodiment 2

0.5725 g of Nass is added to 20 ml of DMF solvent at room temperature and is dissolved. 4 ml of st, 8 ml of BMA and 1.96 ml of VBC monomer are respectively added in nitrogen atmosphere. After the temperature is increased to 50° C., 0.0167 g of AIBN is added. The reaction is conducted for 16 h at a constant temperature of 50° C. The obtained solution is precipitated in a mixture of ethanol and water, and washed repeatedly for three times (1 h each time) with ethanol and water. The ratio of the ethanol to the water is 3:5. The obtained solution is subjected to suction filtration with a funnel. Finally, the obtained solution is dried in a vacuum drying oven of 60° C. for 24 h to obtain a yellowish granular polymer.

0.195 g of copolymer and 0.015 g of lithium chloride are dissolved in 5 ml of N,N-dimethylacetamide. After complete dissolving, 18 microlitres of tetramethyl hexamethylene diamine are added, and cross-linked for 15 minutes at room temperature. The above reaction solution is cast on a glass plate into a membrane. The membrane is dried for 24 h at 40° C. to obtain a cross-linked dense membrane.

The above membrane is stripped from the surface of the glass plate, and is placed in deionized water for 24 h. Then, the membrane is placed in aqueous alkali of 6.0 M, and hydrolyzed for 10 days at 70° C. The sodium hydroxide solution is changed every two days in order to promote the hydrolysis of ester bond.

The above hydrolyzed membrane is flushed with flowing deionized water for 5 minutes and then placed in the deionized water for 24-48 h until the surface of the membrane is neutral. The membrane with a neutral surface is immersed in sulfuric acid solution of 1M, and placed into the deionized water after 24 h for standby.

The obtained membrane has a water absorption rate of 30% and a swelling rate of 12%.

Embodiment 3

0.5725 g of Nass is added to 20 ml of DMF solvent at room temperature and is dissolved. 20 ml of MMA and 3.92 ml of VBC monomer are respectively added in nitrogen atmosphere. After the temperature is increased to 80° C., 0.0167 g of AIBN is added. The reaction is conducted for 20 h at a constant temperature of 80° C. The obtained solution is precipitated in a mixture of ethanol and water, and washed repeatedly for three times (3 h each time) with ethanol and water. The ratio of the ethanol to the water is 9:1. Finally, the obtained solution is dried in a vacuum drying oven of 50° C. for 36 h to obtain a yellowish granular polymer.

0.195 g of copolymer and 0.015 g of lithium chloride are dissolved in 5 ml of N,N-dimethylacetamide. After complete dissolving, 17.4 microlitres of tetramethyl hexamethylene diamine are added, and cross-linked for 60 minutes at room temperature. The above reaction solution is cast on a glass plate into a membrane. The membrane is dried for 24 h at 50° C. to obtain a cross-linked dense membrane.

The above obtained membrane is stripped from the surface of the glass plate, is placed in aqueous alkali of 5.0 M, and hydrolyzed for 10 days at 90° C. The sodium hydroxide solution is changed every two days in order to promote the hydrolysis of ester bond.

The above hydrolyzed membrane is flushed with flowing deionized water for 5 minutes and then placed in the deionized water for 24-48 h until the surface of the membrane is neutral. The membrane with a neutral surface is immersed in sulfuric acid solution of 1M, and placed into the deionized water after 24 h for standby.

The obtained membrane has a water absorption rate of 29% and a swelling rate of 13%.

The invention claimed is:

1. A preparation method for a cross-linked porous membrane from hydrolysis of an ester-containing side chain, wherein the cross-linked porous membrane is prepared through hydrolysis of a copolymer of the ester-containing side chain in a presence of a micromolecule porogen under an alkaline condition; the copolymer of the ester-containing side chain is prepared by copolymerization of styrene, an ester-containing monomer, a vinylbenzyl chloride monomer and an azodiisobutyronitrile initiator; the ester-containing monomer comprises butyl methacrylate, ethyl methacrylate or propyl methacrylate; the micromolecule porogen is lithium chloride; alkalis in the alkaline hydrolysis condition are sodium hydroxide and potassium hydroxide; the chemical structural formula of the cross-linked porous membrane is shown below:

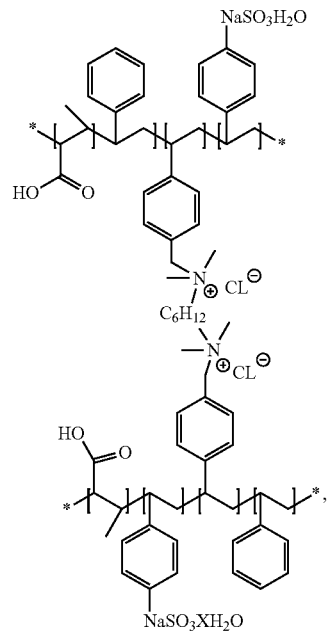

the preparation method comprising the following steps:
(1) synthesizing the copolymer
dissolving sodium sulfonated styrene in solvent N,N-dimethylformamide at room temperature; respectively adding styrene, the ester-containing monomer and the vinylbenzyl chloride monomer and the azodiisobutyronitrile initiator under nitrogen protection; precipitating the obtained solution in a mixture of ethanol and water after reaction for 16-24 h at 50-80° C.; and washing the obtained precipitate with a detergent and drying at vacuum to obtain a yellowish granular product which is the copolymer, wherein the ester-containing monomer comprises butyl methacrylate, methyl methacrylate and ethyl methacrylate; and a molar ratio of the styrene to the ester-containing monomer to the vinylbenzyl chloride to the sodium sulfonated styrene to the azodiisobutyronitrile initiator is 0-35:50-85:12.5:2.5:0.1, wherein a concentration of the sodium sulfonated styrene solvent is 0.125 mmol/ml; and the detergent is the mixture of ethanol and water;

(2) cross-linked membrane forming dissolving the polymer prepared in the step (1) in a solvent at room temperature; adding a cross-linking agent and the micromolecule porogen after dissolving; molar weights of the cross-linking agent and the micromolecule porogen being 12.5% and 7.5% of the molar weight of the polymer; generating a cross-linking reaction for 30-60 minutes at room temperature to obtain a mixture; dropwise adding the mixture to a glass plate; and drying to obtain a dense membrane, wherein a mass ratio of the polymer to the solvent is 3%-10%; and the solvent is N,N-dimethylformamide, N,N-dimethylacetamide, dimethyl sulfoxide or N-methylpyrrolidone; and the cross-linking agent is tetramethyl hexamethylene diamine, and the micromolecule porogen is lithium chloride;

(3) preparing the porous membrane through alkaline thermal hydrolysis stripping the dense membrane from a surface of the glass plate at room temperature, and placing the dense membrane in deionized water; taking out the dense membrane, placing the dense membrane in aqueous alkali of 4-6 M, and hydrolyzing for 7-12 days at 60-90° C.;

flushing the hydrolyzed dense membrane with deionized water and then immersing the hydrolyzed dense membrane in the deionized water for 24-48 h until a surface of the membrane is neutral; immersing the membrane with a neutral surface in sulfuric acid solution of 1 M, and placing the membrane into the deionized water after 24 h for standby.

2. The preparation method for the cross-linked porous membrane according to claim 1, wherein in the step (1) of synthesizing the copolymer, vacuum drying temperature is 40-80° C., and time is 24-48 h.

3. The preparation method for the cross-linked porous membrane according to claim 1, wherein in the step (2) of cross-linked membrane forming, drying temperature is 40-80° C., and drying time is 24-48 h.

* * * * *